United States Patent [19]
Quinn

[11] 3,782,256
[45] Jan. 1, 1974

[54] PUSH BUTTON CONNECTOR CONNECTING CABLE WITH INTEGRAL PUSH BUTTON SWITCH

[75] Inventor: Peter T. Quinn, Littleton, Colo.
[73] Assignee: Honeywell Inc., Minneapolis, Minn.
[22] Filed: Nov. 20, 1972
[21] Appl. No.: 308,154

[52] U.S. Cl............ 95/11.5 R, 95/11 R, 200/51.08, 324/51, 339/177
[51] Int. Cl...................... G03b 9/70, G03b 15/05
[58] Field of Search.................... 95/11.5 R, 11.5 A, 95/11 L, 11 R; 240/1.3; 339/177; 200/51.08; 324/51

[56] References Cited
UNITED STATES PATENTS
3,701,942  10/1972  Kobayashi............................ 324/51
3,424,071  1/1969  Schwahn.......................... 95/11.5 R FOREIGN PATENTS OR APPLICATIONS
997,712  9/1951  France............................. 95/11.5 R
711,215  8/1941  Germany......................... 95/11.5 R Primary Examiner—Robert P. Greiner
Attorney—Arthur H. Swanson et al.

[57] ABSTRACT

A photographic camera is connected to a remotely located electronic flash unit by a connecting device which includes first and second end connector assemblies. A selectively operable switch forms a part of at least one of the end connector assemblies thereby allowing the testing of the remotely located flash unit from the camera location without actuating the shutter of the camera. One embodiment of an end connector assembly includes a diode in series with the selectively operable switch for use with a camera which includes a light sensing circuit of a computer-flash system.

6 Claims, 4 Drawing Figures

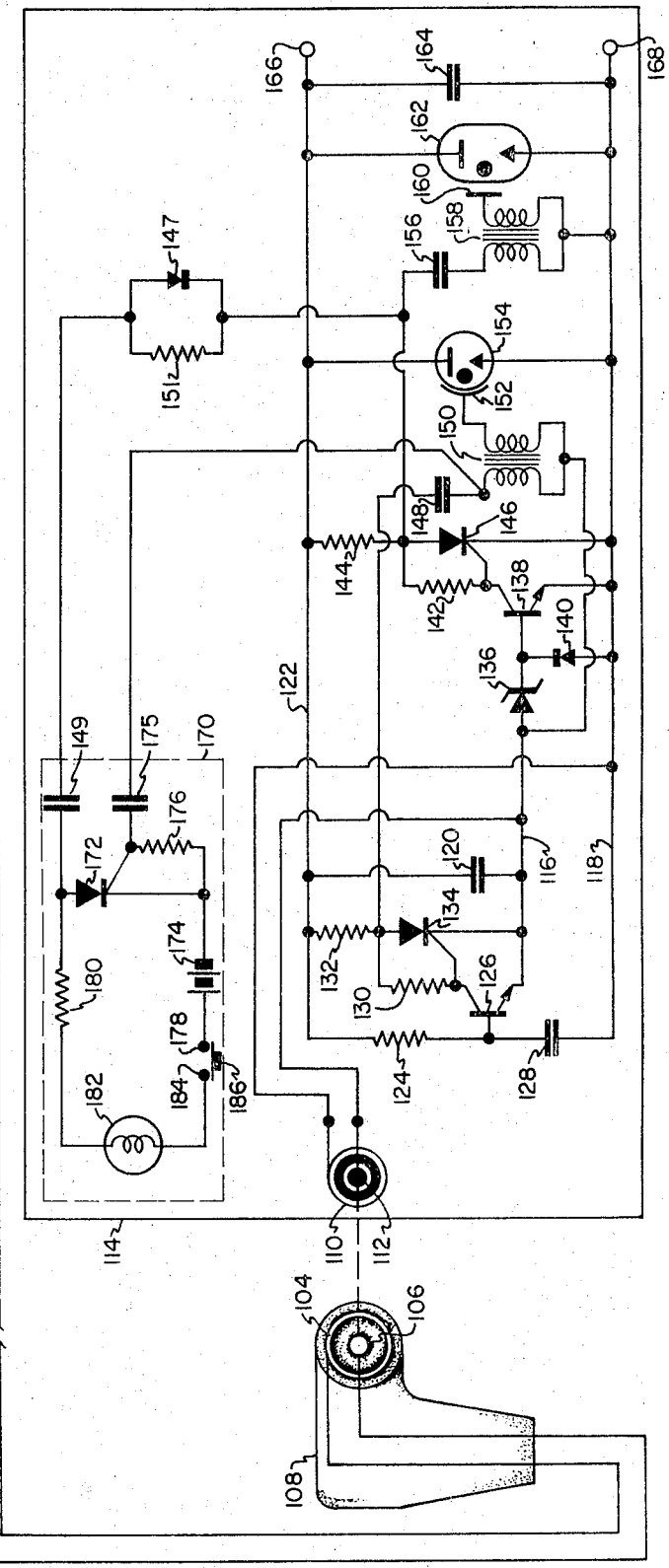
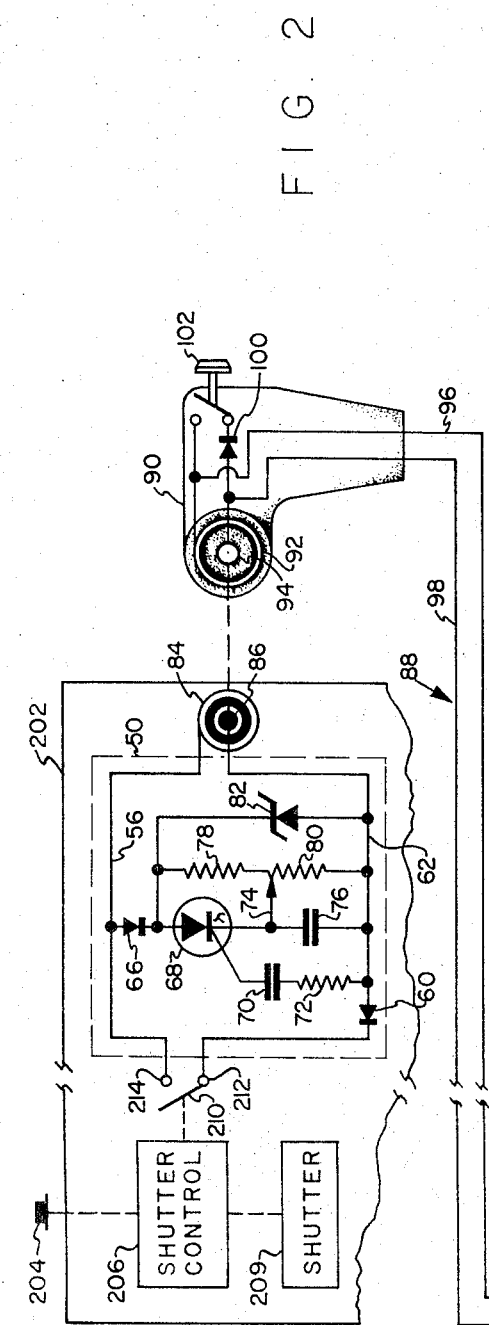
FIG. 2

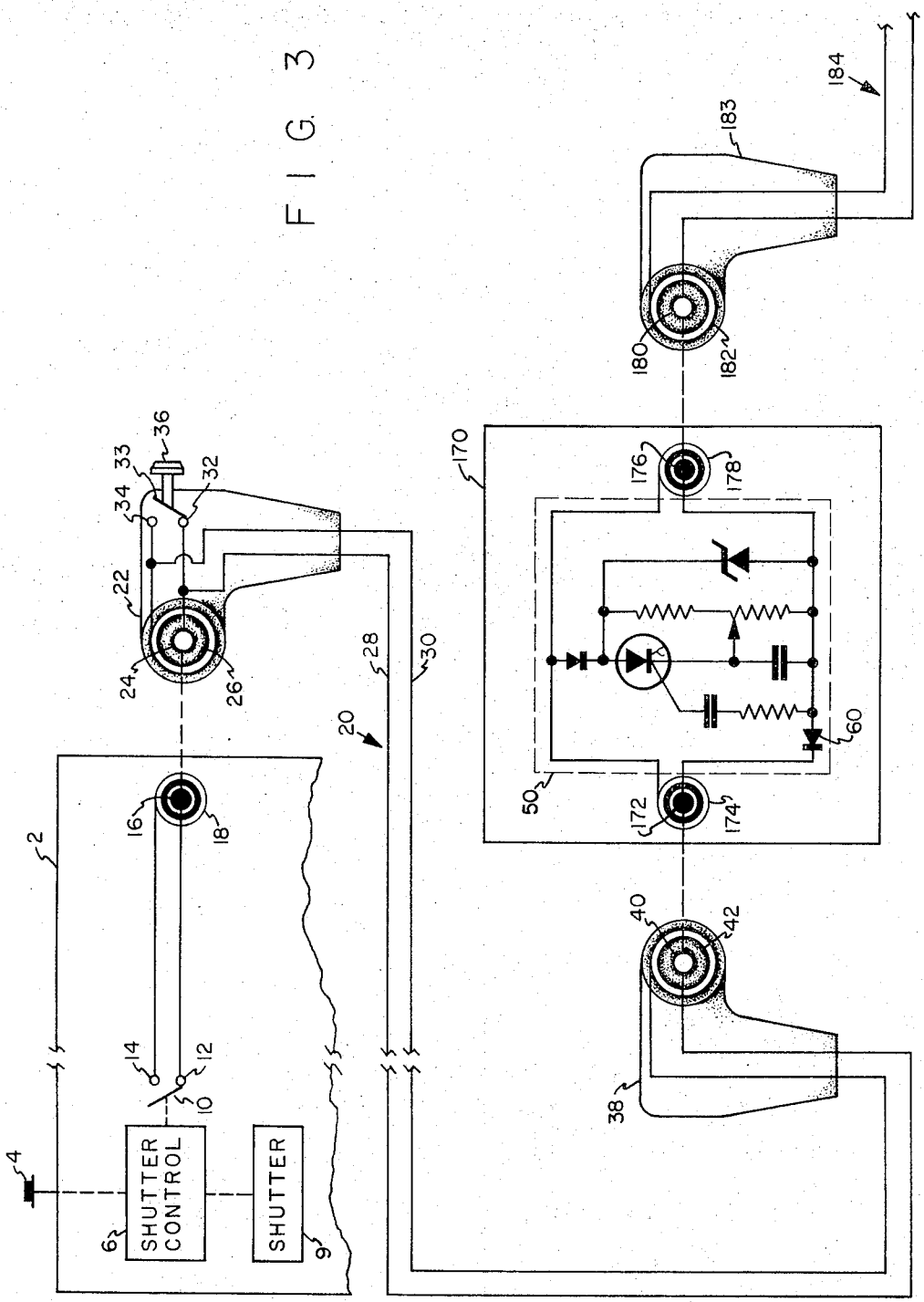

PUSH BUTTON CONNECTOR CONNECTING CABLE WITH INTEGRAL PUSH BUTTON SWITCH

Subject matter described but not claimed herein is described and claimed in a Divisional Application Ser. No. 375,042, filed on June 29, 1973, and in copending applications by Francis T. Ogawa, Ser. Nos. 108,876 and 108,878, both of which were filed on Jan. 22, 1971, and a copending application by Dennis J. Wilwerding, Ser. No. 110,700, filed on Jan. 28, 1971.

The present invention relates generally to photographic circuitry and more particularly to connectors for connecting cameras and flash units.

In the past, some photographic flash units have included a test switch, or so-called "open flash" switch, as part of the flash unit, by which an operator could test-fire the flash unit before taking a picture. However, when indirect lighting or lighting from a position remote from the camera is desired, the flash unit is remote from the associated camera and therefore an operator would have to test-fire the flash unit at its remote location and then return to the camera location to take a picture. Since that practice is both inconvenient and time consuming, there is a need for a photographic system which includes a means for test firing a remote flash unit from the camera location without actuating the shutter of the camera.

Computer-flash systems include a light sensing circuit which generates a flash termination signal to terminate the production of light by the flash unit when a predetermined amount of light has been received by the sensing circuit. Receipt by the light sensing circuit of the predetermined amount of light is indicative of the fact that the light sensitive film within the camera has been properly exposed. Recently, a light sufficiency annunciator has been provided which visually indicates to a photographer, immediately after taking a picture, whether or not there was sufficient light for proper film exposure. If the electronic flash unit has a test flash switch, a photographer could test the flash unit before taking the picture and receive a positive indication whether or not sufficient light will be produced in the particular photographic environment for the proper exposure of a light sensitive film in the camera. However, even in computer flash systems, when indirect lighting is desired, the flash unit is often positioned remotely from the camera and by the time the photographer returns to the situs of the camera, after test firing the flash unit, the ambient light conditions may change and render the light sufficiency indication inaccurate. Therefore there is a need for a means to enable the test firing of a remotely located electronic flash unit of a computer flash system from the camera location without the need for actuating the shutter of the camera.

It is therefore an object of the present invention to provide means for overcoming these deficiencies of prior art apparatus.

It is another object of the present invention to provide a device for test firing a flash unit from the remote situs of an associated camera.

It is still another object of the present invention to provide a device for test firing an electronic flash unit from the remote situs of an associated camera without actuating the shutter of the camera.

It is yet another object of the present invention to provide a device for test firing an electronic flash unit of a computer-flash photographic system from the remote situs of an associated camera without actuating the shutter of the camera.

It is a further object of the present invention to provide a device for test firing an electronic flash unit of a computer-flash photographic system from the remote situs of an associated camera which includes a light sensing circuit, without actuating the shutter of the camera.

It is still a further object of the present invention to provide a device as set forth which is inexpensive and adaptable to presently available camera and flash units.

In accomplishing these and other objects, there has been provided in accordance with the present invention, a connecting device for connecting shutter-switch terminals of a camera with a remotely located flash unit. The connector end assembly which is plugged into the camera includes a selectively operable switch for providing an effective short circuit across the shutter switch terminals of the camera whereby to selectively test fire the flash unit from situs of the camera without requiring the actuation of the shutter of the camera.

A better understanding of the present invention may be had from the following detailed description, when read in connection with the accompanying drawings in which:

FIG. 2 is a schematic diagram of a computer-flash photographic system including another embodiment of the connecting device for use with a camera having a light sensing circuit therein.

FIG. 3 is a schematic diagram of a computer-flash system having a remote light sensor and including an embodiment of the connecting device of the present invention.

FIG. 4 is a detailed drawing of one terminal of the connecting device shown in FIG. 1.

Figure 1:
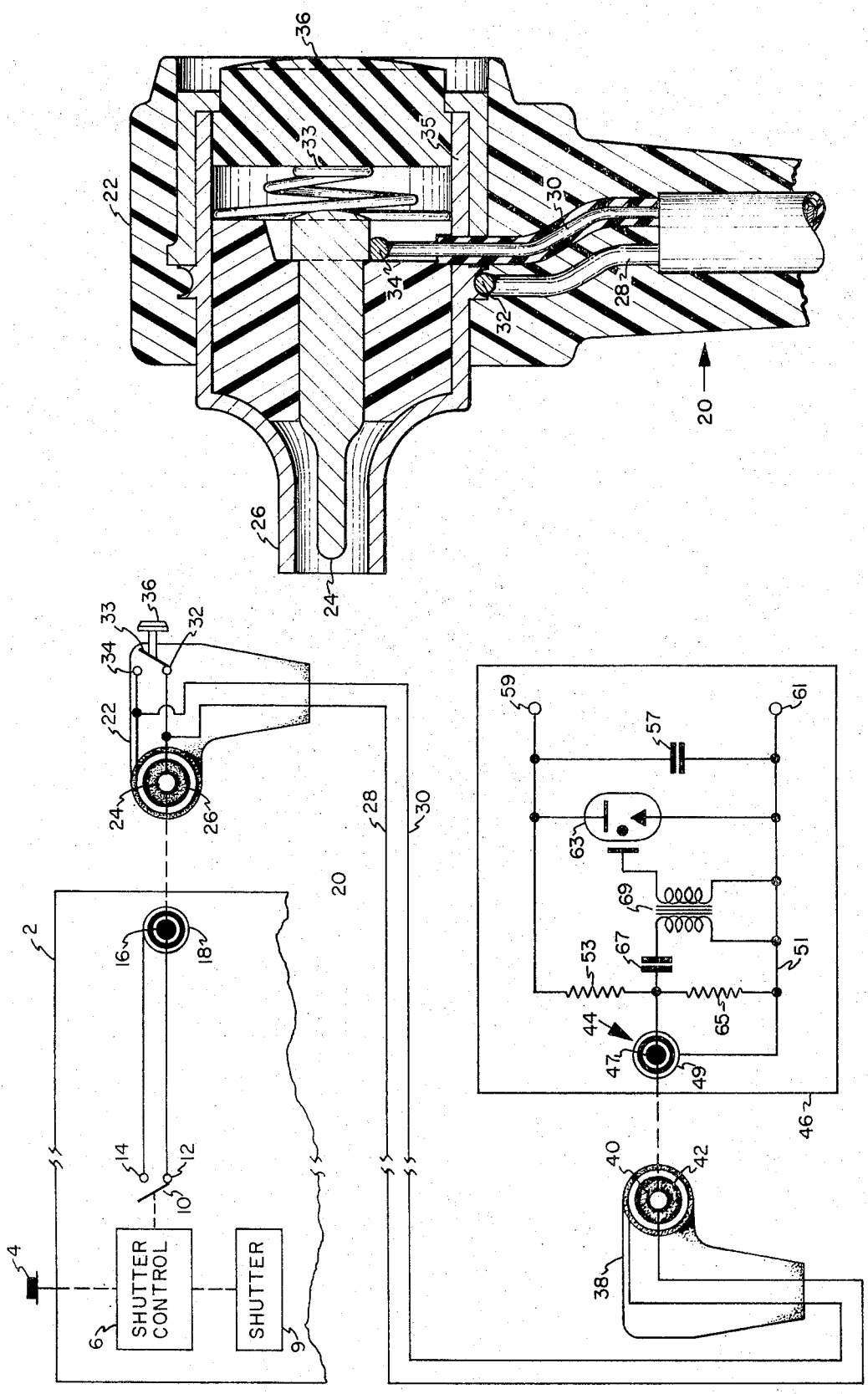
FIG. 1 is a schematic diagram of a photographic system including an embodiment of the connecting device of the present invention.

Referring in detail in FIG. 1, there is shown a camera 2 having a shutter actuator 4. The shutter actuator 4 is operatively coupled to a shutter control mechanism 6 which, in turn, controls the shutter 9 of the camera 2 in a manner well known in the art. The shutter control mechanism 6 also controls a shutter switching member 10 which is operable to provide an effective short circuit between shutter switching contacts 12 and 14 in synchronism with the operation of the shutter. The shutter switching contacts 12 and 14 are connected to camera switching terminals 16 and 18, respectively, of the camera 2. A connector means generally indicated at 20 includes a first end connector means 22 having first and second terminals 24 and 26 arranged for connection to the camera switching terminals 16 and 18, respectively of the camera 2. The terminals 24 and 26 are connected to leads 28 and 30, respectively. The first and second terminals 24 and 26 of the first end connector means 22 are also connected to first and second switching contacts 32 and 34, respectively. A switching means 36 is selectively operable to provide an effective short circuit across the switching contacts 32 and 34, and, hence, the leads 28 and 30. The leads 28 and 30 comprise a conductor means for connecting the first end connector means 22 with a second end connector means 38 of the connector 20. The second end connector means 38 includes first and second terminals 40 and 42, respectively. The first and second terminals 40 and 42 of the second end connector means 38 are arranged for connection to corresponding control terminals 47 and 49 of a plug-in recepticle 44 of a flash unit 46. The terminal 49 of the flash unit 46 is connected to a common bus 51, while the terminal 47 is connected through a resistor 53 to a high voltage bus 55. The terminal 47 is also connected through a resistor 65 to the common bus 51. A storage capacitor 47 is connected between the high voltage bus 55 and the common bus 51. The high voltage bus 55 and the common bus 51 are connected to terminals 59 and 61, respectively, which are, in turn, arranged for connection to the usual capacitor charging means (not shown) for maintaining the charge on the capacitor 57 at a relatively high level. A flash tube 63 is connected across the storage capacitor 57. The junction between the resistors 53 and 65 is connected to one terminal of a capacitor 67 the other terminal of which is connected through the primary winding of a transformer 69 to the common bus 51. A triggering terminal of the flash tube 63 is connected through a secondary winding of the transformer 69 to the common bus 51. The capacitor 67 is charged to a steady state level through the resistor 53.

In operation, a photographer will insert the first end connector means 22 of the connecting device 20 into the camera switching terminals 16 and 18 of the camera 2, and the second end connector means 38 of the connecting device 20 into the corresponding receptacle 44 of the flash unit 46. A photographer may then locate the flash unit 46 remotely from the camera 2 in order to obtain the highly desirable incidents of indirect or displaced lighting. The photographer may then test fire the flash unit 46 from the location of the camera 2 by depressing the switching means 36, which is independent of the shutter actuator 4, thereby providing an effective short circuit or contact closure across the leads 28 and 30. The effective short circuit across the leads 28 and 30 establishes an effective contact closure across the terminals 49 and 47 of the flash unit 46. That effective contact closure shorts out the resistor 65, thereby allowing the capacitor 67 to dump its charge through the path comprising the switching member 33 and the primary winding of the transformer 69. The dumping of the charge on the capacitor 67 through the primary winding of the transformer 69 induces a triggering pulse in the secondary winding of the transformer 69 which, in turn, triggers the flash tube 63. The flash tube 63 then provides light for the illumination of the scene to be photographed. Thus, the switching means 36 permits a test firing of the remotely located flash unit 46 without operating the shutter of the camera 2. This is a desirable feature since if for any reason the flash unit 46 is not functioning properly, a test flash will so indicate before the light sensitive film of a camera is actually exposed to the insufficient light. In the past, the test flash switch has been made a part of the flash unit 46 itself, and a photographer would have to test the flash unit 46 at its remotely located position with respect to the camera 2 before taking the picture. With the present invention, a photographer may remain at the situs of the camera 2 and test the remote flash unit 46, without operating the shutter of the camera 2, by merely operating the switching means 36. The switching means 36 may also be permanently mounted on the camera 2 to selectively provide an effective short circuit across the shutter switching terminals 16 and 18 independently of the shutter actuator 4.

FIG. 2 shows a computer-type flash arrangement wherein a camera 202 includes a light sensing circuit 50. The shutter actuator 204 of the camera 202 actuates a shutter control mechanism 206 which in turn operates the shutter 209 of the camera 202. The shutter actuator also effects a closure of a switching member 210 thereby providing an effective short circuit between shutter switching contacts 211 and 214. In FIG. 2, the contact 214 is connected by a lead 56 to a camera switching terminal 84 of the camera 202. The switching contact 212 is connected through the cathode to anode path of a diode 60 to another lead 62. The lead 62 is connected to another camera switching terminal 86. The lead 56 is connected to the anode of a diode 66, the cathode of which is connected in turn to the anode of a light activated silicon controlled rectifier (LASCR) 68. The gate electrode of the LASCR 68 is connected through a capacitor 70 and a resistor 72 in series, to the lead 62. The cathode of the LASCR 68 is connected to a slider 74 of a slidewire resistor 80 and also through a capacitor 76 to the lead 62. The anode of the LASCR 68 is connected through a resistor 78 to one end of the slide wire resistor 80, the other end of which is connected to the lead 62. The lead 62 is connected through the anode to cathode path of a zenor diode 82 to the anode terminal of the LASCR 68. A connecting device generally shown at 88, includes a first end assembly means 90 having first and second terminals 92 and 94 arranged for connection to the camera switching terminals 84 and 86, respectively. The terminals 92 and 94 of the first end assembly means 90 are connected to lead wires 96 and 98 respectively of the connecting device 88. The lead wire 98 is connected through the anode to cathode path of a diode 100 to one contact of a selectively operable switching device 102 within the first end connector means 90. The other contact of the switching device 102 is connected to the lead 96. The diode 100 and switching device 102 comprise a selectively operable switching means which is built into the first end connector means or end assembly 90 of the connecting device 88. The lead wires 96 and 98, which generally comprise a conductor means, are connected to first and second terminals 104 and 106 respectively, of a second end connector means or end assembly 108 of the connector means 88. The terminals 104 and 106 are arranged for connection to corresponding flash control terminals 110 and 112, respectively, of an associated electronic flash unit 114. The flash control terminal 112 is connected to a control signal bus 116 while the flash control terminal 110 is connected to a common bus 118. The control signal bus 116 is connected through a capacitor 120 to a high voltage bus 122. The high voltage bus 122 is connected to one terminal of a resistor 124 the other terminal of which is connected to the base electrode of an NPN transistor 126. The base of the transistor 126 is also connected through a capacitor 128 to the common bus 118. The emitter of the transistor 126 is connected to the control signal bus 116 while its collector is connected through two series resistors 130 and 132 to the high voltage bus 122. The junction between the two resistors 130 and 132 is connected to the anode of a silicon controlled rectifier (SCR) 134, the cathode of which is connected to the control signal bus 116. The gate of the SCR 134 is connected to the collector of the transistor 126. The control signal bus 116 is connected through the anode to cathode path of a zener diode 136 to the base electrode of an NPN transistor 138. The base of the transistor 138 is also connected through the cathode to anode path of a diode 140 to the common bus 118. The emitter of the transistor 138 is connected to the common bus 118 while its collector is connected through two series resistors 142 and 144 to the high voltage bus 112. The junction between the two resistors 142 and 144 is connected to the anode of an SCR 146, the cathode of which is connected to the common bus 118. The gate of the SCR 146 is connected to the collector of the transistor 138. The junction between the resistors 130 and 132 is connected to one side of a capacitor 148 the other side of which is connected through one winding of a transformer 150 to the control signal bus 116. The secondary winding of the transformer 150 has one end connected to the control signal bus 116 and its other end connected to a triggering electrode 152 of a quench tube 154. The quench tube 154 is connected between the high voltage bus 142 and the common bus 118.

The common point between the resistors 142 and 144 is connected to one side of a capacitor 156 the other side of which is connected through the primary winding of a transformer 158 to the common bus 118. The secondary winding of the transformer 158 is connected between the common bus 118 and a triggering electrode 160 of a flash tube 162. The flash tube 162 is connected between the high voltage bus 122 and the common bus 118. A storage capacitor 164 is also connected between the high voltage bus 122 and the common bus 118. The high voltage bus 122 is connected to a supply terminal 166; the common bus 118 is connected to another supply terminal 168. The two supply terminals 166 and 168 are connected to the usual capacitor charging means which are not shown in FIG. 2. Such capacitor charging means are well known in the art and it is sufficient to say that the capacitor 164 is normally maintained in the charged state by the aforementioned charging means whereby a relatively high voltage is maintained across the capacitor 164.

The electronic flash unit 114 also includes a quench annunciator or light-sufficiency indicator circuit 170. The anode of the SCR 146 is connected through the cathode to anode path of a diode 147 to one side of a capacitor 149 the other side of which is connected to the anode terminal of an SCR 172. A resistor 151 is connected across the diode 147. The cathode of the SCR 172 is connected to the negative terminal of a battery 174. The gate of the SCR 172 is connected through a capacitor 175 to the junction between the primary winding of the transformer 150 and the capacitor 148. A resistor 176 is connected between the gate and cathode of the SCR 172. The positive terminal of the battery 174 is connected to a contact 178 of a switch device 186. The anode of the SCR 172 is connected through a resistor 180 to one of a voltage responsive light indicator 182, the other end of which is connected to a contact 184. The switching member 186 is selectively operable to provide an effective circuit closure across the terminals 184 and 178. The annunciator circuit 170 is the subject of the above referenced copending application by Dennis J. Wilwerding, Ser. No. 110,700.

In operation, the capacitors 148 and 156 are charged to a steady state value through the resistors 132 and 144, respectively, from the high voltage bus 122. The transistors 126 and 138 are initially conducting. The switching member 186 is closed, and the SCR 172 is non-conductive. The connecting device 88 connects the camera 202 to the remotely located electronic flash unit 114 which is arranged to illuminate a scene to be photographed. By using the connecting device 88 of the present invention, the photographer may test fire the flash unit 114 from the location of the camera 202 by actuating the selectively operable switching means 102 which is part of the first end assembly means 90. If the flash unit being used does not include the quench annunciator circuit 170, a photographer may test fire the flash unit to insure that the light producing circuit of the flash unit is functioning before actually exposing the light sensitive film of the camera by actuating the shutter button 204 thereof. When, however, the flash unit includes the quench annunciator circuit 170, such as the flash unit 114 in the present example, a photographer may not only insure that the light producing portion of the flash unit 114 is functioning properly, but also determine whether or not the light produced by that flash unit is sufficient to properly illuminate the scene being photographed, thereby insuring that the light sensitive film of the camera 202 will be properly exposed before actually taking the picture. In the present example, a photographer would close the switch 102 thereby providing an effective switch closure between the leads 96 and 98 and therefore between the common bus 118 and the control signal bus 116 of the flash unit 114. That effective switch closure or short circuit will provide a lower resistance path (diode 100 and switch 102) between the control signal bus 116 and the common bus 118 than existed before the switching device 102 had been actuated (diode 136 and base to emitter junction of transistor 138). The presence of that lower resistance path will cause the potential at the control signal bus 116 to decrease with respect to the potential at the common bus 118. That relative decrease in potential at the control signal bus will cause the transistor 138 to become non-conductive. With the transistor 138 non-conductive, a current will flow into the gate electrode of the SCR 146, thereby rendering the SCR 146 conductive. When the SCR 146 is conductive, the capacitor 156 will dump its charge through the circuit comprising the SCR 146 and the primary winding of the transformer 158, thereby inducing a triggering pulse to appear at the triggering electrode 160 of the flash tube 162. The flash tube will then ignite thereby illuminating the scene to be photographed. When the flash tube 162 begins to conduct, the potential appearing at the high voltage bus 122 will suddenly decrease. That decrease is coupled through the capacitor 120 to the control signal bus 116 thereby effecting a relative decrease in the potential at the control bus 116 with respect to the potential at the common bus 118. That relative decrease in potential is coupled back through the connecting device 88 and is applied to the light sensing circuit 50 within the camera 202. Since the potential at the control signal bus 116 goes negative with respect to the potential at the common bus 118, the potential appearing on the lead 98 will correspondingly go negative with respect to the potential appearing on the lead 96. The relatively negative going signal appearing at the lead 98 will back-bias the diode 100 and thereby effectively isolate the switching device 102 from the rest of the circuit. The relative decrease appearing on the lead 98 with respect to the lead 96 will be coupled through the first end assembly terminals 92 and 94 to the light sensing circuit 50 of the camera 202. That relative decrease in potential forward biases the diode 66, thereby enabling a subsequent triggering of the LASCR 68. The LASCR 68 will then begin to generate a current representative of the light received thereby from the scene being illuminated by the flash unit 114. The capacitor 70 integrates that current and when the potential at the gate of the LASCR 68 exceeds that present at the cathode thereof, the LASCR 68 becomes conductive. The value of the elements in the light sensing circuit 50 are so chosen that the predetermined potential required to turn on the LASCR 68 corresponds to the amount of light required to properly expose the light sensitive film in the camers 48. Therefore, the conduction initiated through the LASCR 68 is indicative of the fact that the light sensitive film within the camera 48 has been properly exposed. When the LASCR 68 becomes conductive, a relatively lower resistance path is presented between the camera switching terminals 84 and 86 of the camera 202 and therefore between the common bus 118 and the control signal bus 116, respectively, of the flash unit 114. That lower resistance path causes the potential difference between the control signal bus 116 and the common bus 118 to decrease which in turn renders the transistor 126 non-conductive. When the transistor 126 is not conducting, a current will flow into the gate electrode of the SCR 134 and the SCR 134 will become conductive. When the SCR 134 becomes conductive, the capacitor 148 dumps its charge through the circuit comprising the SCR 134 and the primary winding of the transformer 150. That rapid discharging of the capacitor 148 through the primary winding of the transformer 150 induces a triggering pulse to appear across the secondary winding of the transformer 150 which is applied to the triggering electrode 152 of the quench tube 154. That triggering pulse initiates conduction through the quench tube 154.

The dumping of the capacitor 48, in addition to firing the quench tube, provides a positive going pulse to be applied through the capacitor 175 to the gate of the SCR 172 in the annunciator circuit 170. That positive going pulse renders the SCR 172 conductive, thereby completing an energization circuit for the annunciator lamp 182. Therefore, whenever the quenching operation of the flash unit 114 is initiated, the annunciator indicator 182 will give off light, thereby providing a perceptible signal to the photographer, who may be positioned at the remote situs of the camera, that the scene being photographed has been sufficiently illuminated to properly expose the light sensitive film in the camera 202. The annunciator indicator lamp 182 may be selectively turned off by the photographer by opening the switching member 186 or by the initiation of another flash cycle. When another flash cycle is initiated, the capacitor 156 will dump its charge as hereinbefore explained. That action will provide a negative going signal which is applied through the capacitor 149 to the anode of the SCR 172. That negative going signal applied to the anode of the SCR 172 will render the SCR 172 nonconductive, thereby opening the energization circuit for the indicator lamp 182. A subsequent initiation of the quenching operation of the flash unit 114 will again render the SCR 172 conductive and energize the annunciator lamp 182 as hereinbefore explained.

Since the quench tube 154 has a much lower conducting resistance than the flash tube 162, conduction through the quench tube 154 effects a very rapid discharging of the storage capacitor 164, and the potential at the high voltage bus 122 will rapidly decrease to a point which is insufficient to support conduction in either the flash tube 162 or the quench tube 154, at which time both tubes will cease to conduct. With the tubes 154 and 162 nonconducting, the storage capacitor 164 will again begin to charge up to its high voltage level in preparation for a subsequent initiation of the computer flash system. The transistors 126 and 138 will again begin to conduct and the relative potentials of the high voltage bus 122 and the control signal bus 116 will be restored to their initial magnitudes. Upon test firing the flash unit 114 from the situs of the camera 202 and observing the energization of the annunciator indicator lamp 182, a photographer will know that the flash unit 114 will provide sufficient illumination to obtain proper exposure of the light sensitive film within the camera 202. The photographer may then take the picture by actuating the shutter button 204, which, in turn, will both actuate the computer flash circuit by closing the switching member 210, and actuate the shutter 209 of the camera 202 to allow light from the scene being photographed to expose the light sensitive film within the camera 202.

FIG. 3 shows the camera 2 and connecting device 20 of FIG. 1 connected to a light sensing unit 170. The light sensing unit 170 includes the light sensing circuit 50 which was included within the camera 202 of FIG. 2. However, in FIG. 3, light sensing unit 170 is independently movable with respect to both the camera 2 and an associated flash unit, such as the flash unit 114 of FIG. 2. The terminals 40 and 42 of the connecting device 20 are connected to corresponding terminals 172 and 174, respectively, of the sensing unit 170, which are in turn connected to the light sensing circuit 50. The light sensing circuit 50 is connected through terminals 176 and 178 to one end assembly 183 of another connecting device 184 which is connected to a flash unit such as the flash unit 114 shown in FIG. 2. The selectively operable switching means 36 of the connecting device 20 is shown in FIG. 3 as being located at the situs of the camera 2. That arrangement enables a photographer to test fire the flash unit from the situs of the camera 2. In FIG. 3, the diode 100 of the end assembly 90 of FIG. 2 is not required in either the end assembly 22 or the end assembly 38 since the isolating function performed by the diode 100 in FIG. 2 is performed by the diode 60 included in the light sensing circuit 50 of FIG. 3. If, however, a selectively operable switching means were to be included in the end assembly 183 of the connecting device 184, an isolating diode in series therewith would be required as hereinbefore explained in connection with FIG. 2.

FIG. 4 shows a physical embodiment of the first end assembly 22 of the connecting device 20 shown in FIG. 1. The spring 33 of FIG. 4 constitutes the switching member 33 of FIG. 1, connecting contacts 32 and 34 upon depression of the push button 36. The base portion of the conical spring 33 remains in contact with the metal sub-housing 35 which, in turn, is connected to the contact 32. When the push button 36 is depressed, the apex of the conical spring 33 comes into engagement with the crown of the plug terminal 24 thereby completing an electrical path between the contacts 32 and 34 and hence the terminals 24 and 26. When the manual pressure is released, the push button 36 is returned to its normal position by the conical spring 33.

Thus there has been provided, in accordance with the present invention, a connecting device for connecting component parts of a photographic system including a camera and a remotely located flash unit. The camera terminal of the connecting device includes a selectively operable switch for providing an effective short circuit across the conductors of the connecting device whereby an operator may selectively test fire the remotely located flash unit from the position of the camera without actuating the shutter of the camera.

The embodiments of the present invention in which an exclusive property or privilege is claimed are defined as follows:

1. The combination comprising:
   camera means at a first location, said camera means having a pair of shutter switch terminals;
   a flash unit at a second location remote from said first location, said flash unit having a pair of control terminals;
   connecting device connecting said camera shutter switch terminals with said flash unit control terminals, said camera means including a shutter mechanism selectively operable for actuating a shutter of said camera and for providing an effective switch closure across said shutter switch terminals of said camera means whereby to initiate an operation of said flash unit; and
   switching means in said connecting device for selectively providing an effective switch closure across said camera shutter switch terminals independently of said shutter mechanism, whereby to enable a selective test-firing of the flash unit without actuating the shutter mechanism.

2. The combination as set forth in claim 1 wherein said switching means comprises a selectively operable switching device in series with a diode means.

3. The combination comprising:
   camera means;
   an electronic flash unit; and
   a connecting device connecting said camera means with said electronic flash unit, said connecting device including:
   first end assembly means having first and second terminals thereof arranged for connection to said camera means;
   second end assembly means having first and second terminals thereof arranged for connection to said flash unit;
   conductor means connecting said first terminal of said first end assembly means with said first terminal of said second end assembly means, and said second terminal of said first end assembly means with said second terminal of said second end assembly means; and
   switching means positioned at one of said terminal means, said switching means being selectively operable for providing an effective switch closure between said first and second terminals of said first end assembly means.

4. The combination as set forth in claim 3 wherein said switching means comprises a selectively operable switching device in series with a diode means.

5. The combination as set forth in claim 3 wherein said 1st end assembly means comprises:
   a moulded housing;
   a metallic sub-housing supported by said moulded housing, said sub-housing being in electrical contact with said second terminal of said 1st end assembly means;
   a conical spring means having base and apex portions thereof, said base portion of said spring means being supported by and in electrical contact with said metallic sub-housing; and
   an activating member slidably secured within said sub-housing engaging said head portion of said spring means, said actuating member being responsive to an externally applied force for compressing said spring means whereby said apex portion of said spring means is forced into electrical contact with said first terminal of said first end assembly means, said spring means being further operable to disengage from said first terminal upon releasing said externally applied force from said actuating member.

6. The combination comprising:
   a camera means including a pair of switching terminals;
   a shutter mechanism selectively operable for actuating a shutter of said camera means and for providing an effective switch closure across said switching terminals; and
   a connecting device connected to said switching terminals, said connecting device including:
   end assembly means for connecting said connecting device to an associated photographic device; and
   switching means within said connecting device for selectively providing an effective switch closure across said pair of switching terminals independently of said shutter mechanism.

* * * * *